United States Patent
Aggarwal et al.

(10) Patent No.: US 12,523,732 B1
(45) Date of Patent: Jan. 13, 2026

(54) OPTIMIZING SOLAR TRACKER TRACKING USING 3D MODELING

(71) Applicant: BrightNight Power LLC, West Palm Beach, FL (US)

(72) Inventors: Mohit Aggarwal, Austin, TX (US); Cédric Leroy, Austin, TX (US); Benjamin Calvin Bourne, Davis, CA (US)

(73) Assignee: BRIGHTNIGHT POWER LLC, West Palm Beach, FL (US)

( * ) Notice: Subject to any disclaimer, the term of this patent is extended or adjusted under 35 U.S.C. 154(b) by 0 days.

(21) Appl. No.: 19/309,415

(22) Filed: Aug. 25, 2025

(51) Int. Cl.
 *G01S 3/786* (2006.01)
 *F24S 50/20* (2018.01)

(52) U.S. Cl.
 CPC ............. *G01S 3/7861* (2013.01); *F24S 50/20* (2018.05); *F24S 2201/00* (2018.05)

(58) Field of Classification Search
 CPC ...... G01S 3/7861; F24S 50/20; F24S 2201/00
 USPC ...................................................... 250/203.4
 See application file for complete search history.

(56) References Cited

U.S. PATENT DOCUMENTS

| | | | |
|---|---|---|---|
| 11,442,132 B2 | 9/2022 | Ma et al. | |
| 2020/0294160 A1* | 9/2020 | Chaudhari | G06Q 50/06 |
| 2023/0003918 A1* | 1/2023 | Job | G06T 7/0008 |
| 2023/0124752 A1* | 4/2023 | Guerrero Pérez | G05B 17/02 |
| | | | 700/287 |
| 2024/0235461 A1* | 7/2024 | Sun | H02S 40/30 |
| 2024/0372362 A1 | 11/2024 | Taha et al. | |

OTHER PUBLICATIONS

"Backtracking on a hill", Jun. 23, 2025, https://www.pvsyst.com/help-pvsyst7/backtracking_onhill.htm.
Gonvarri Solar Steel, "Tracking Control System TracSmart System", https://www.gsolarsteel.com/products/control-system/.
John Sharp, "Backtracking and Diffuse Light Strategies With Smartrafk From Array Technologies", Aug. 27, 2020, https://arraytechinc.com/blog/smartrack-backtracking/.
PVH, "How 3D Backtracking Improves Energy Performance in Solar Plants?", Sep. 4, 2025, https://pvhardware.com/how-3d-backtracking-improves-energy-performance-in-solar-plants/.

* cited by examiner

*Primary Examiner* — Thanh Luu
*Assistant Examiner* — Mai Thi Ngoc Tran
(74) *Attorney, Agent, or Firm* — Foley & Lardner LLP

(57) ABSTRACT

Systems and methods for optimizing power output of a photovoltaic (PV) power plant are disclosed. A method includes obtaining spatial data of the PV power plant and generating a 3D model based on the spatial data. Shading patterns for PV modules are simulated using the 3D model. Optimized tracking parameters for solar trackers are determined based on the simulated shading patterns. The optimized tracking parameters are then applied to the solar trackers. The method may further include actuating the solar trackers according to the optimized tracking parameters to improve energy capture and efficiency of the PV power plant.

10 Claims, 3 Drawing Sheets

OPTIMIZING SOLAR TRACKER TRACKING USING 3D MODELING

BACKGROUND

Photovoltaic (PV) power plants use solar power to generate electricity using arrays of solar panels. Solar trackers can be used to orient PV modules to maximize energy capture as the sun's position changes throughout the day. However, optimizing the performance of large-scale PV installations with complex topographies presents significant challenges.

SUMMARY

At least one aspect relates to a method. The method can be performed, for example, by one or more processors coupled to non-transitory memory. The method can include obtaining spatial data of a photovoltaic (PV) power plant including a plurality of PV modules oriented by a plurality of solar trackers. The method can include generating a 3D model of the PV power plant based on the spatial data. The method can include simulating shading patterns for the plurality of PV modules using the 3D model. The method can include determining optimized tracking parameters for each solar tracker of the plurality of solar trackers based on the simulated shading patterns. The method can include applying the optimized tracking parameters to the plurality of solar trackers.

In some implementations, the method can include actuating the plurality of solar trackers according to the optimized tracking parameters. In some implementations, the spatial data comprises LIDAR (Light Detection and Ranging) data including row spacing, racking table coordinates, tracker pile heights, and terrain profile information. In some implementations, the optimized tracking parameters include at least one effective row spacing. Some implementations have different tracking parameters for morning or afternoon periods. Different parameters may be used for adjacent rows with potentially different spacing. In some implementations, the at least one effective row spacing corresponds to a solar position or time of day, such as an effective morning row spacing or an effective evening row spacing.

In some implementations, simulating the shading patterns for the plurality of PV modules using the 3D model comprises applying a ray-tracing or geometry-aware shading model to the 3D model to compute shading events across the plurality of PV modules. In some implementations, computing the shading events across the plurality of PV modules includes computing at least one of bypass diode behavior, tracker alignment, and diffuse irradiance contribution.

In some implementations, determining the optimized tracking parameters comprises simulating sun paths for different days and seasons. In some implementations, determining the optimized tracking parameters comprises determining the optimized tracking parameters that maximize energy generation for PV modules of the plurality of PV modules oriented by each solar tracker across the different days and seasons.

In some implementations, the method can include validating the 3D model using actual energy production data from a set of PV modules of the plurality of PV modules oriented by a reference solar tracker of the plurality of solar trackers. In some implementations, validating the 3D model comprises comparing model-predicted energy production data generated using the 3D model to the actual energy production data. In some implementations, validating the 3D model comprises, based on the comparison, adjusting parameters of the 3D model to reduce a difference between the model-predicted energy production data and the actual energy production data.

At least one aspect relates to a non-transitory, computer-readable medium. The non-transitory, computer-readable medium can include instructions which, when executed by one or more processors, cause the one or more processors to obtain spatial data of a photovoltaic (PV) power plant including a plurality of PV modules oriented by a plurality of solar trackers. The instructions can cause the one or more processors to generate a 3D model of the PV power plant based on the spatial data. The instructions can cause the one or more processors to simulate shading patterns for the plurality of PV modules using the 3D model. The instructions can cause the one or more processors to determine optimized tracking parameters for each solar tracker of the plurality of solar trackers based on the simulated shading patterns. The instructions can cause the one or more processors to apply the optimized tracking parameters to the plurality of solar trackers.

In some implementations, the instructions can cause the one or more processors to actuate the plurality of solar trackers according to the optimized tracking parameters. In some implementations, the spatial data comprises LIDAR data including row spacing, module tilt, azimuth, and terrain profile information. In some implementations, the optimized tracking parameters include at least one effective row spacing. In some implementations, the at least one effective row spacing corresponds to a solar position or time of day, such as an effective morning row spacing or an effective evening row spacing.

In some implementations, the instructions cause the one or more processors to simulate the shading patterns for the plurality of PV modules using the 3D model by applying a ray-tracing or geometry-aware shading model to the 3D model to compute shading events across the plurality of PV modules. In some implementations, computing the shading events across the plurality of PV modules includes computing at least one of diode behavior, tracker alignment, and diffuse irradiance contribution.

In some implementations, the instructions cause the one or more processors to determine the optimized tracking parameters by simulating sun paths for different days and seasons. In some implementations, the instructions cause the one or more processors to determine the optimized tracking parameters by determining the optimized tracking parameters that maximize energy generation for PV modules of the plurality of PV modules oriented by each solar tracker across the different days and seasons.

In some implementations, the instructions can cause the one or more processors to validate the 3D model using actual energy production data from a set of PV modules of the plurality of PV modules oriented by a reference solar tracker of the plurality of solar trackers. In some implementations, validating the 3D model comprises comparing model-predicted energy production data generated using the 3D model to the actual energy production data. In some implementations, validating the 3D model comprises, based on the comparison, adjusting parameters of the 3D model to reduce a difference between the model-predicted energy production data and the actual energy production data.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF FIGURES

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
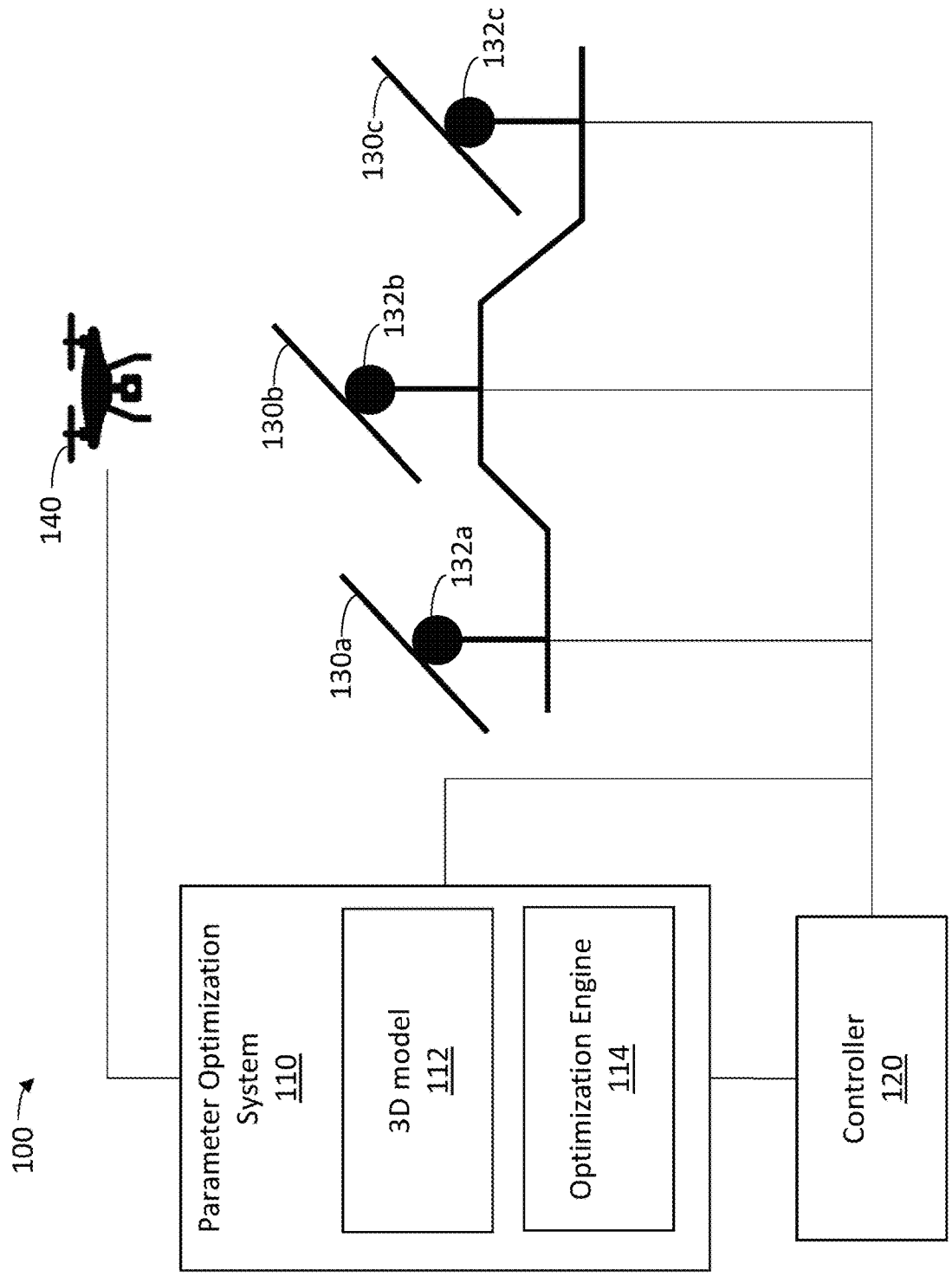
FIG. 1 illustrates an environment for optimizing solar tracker parameters.

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

The techniques described herein relate to optimizing tracking parameters of solar trackers in photovoltaic (PV) power plants to maximize energy capture and efficiency. PV power plants can use solar trackers to orient arrays of solar panels throughout the day as the sun moves across the sky. Solar trackers can adjust the orientation of PV modules to minimize the angle of incidence of sunlight and maximize power generation. However, in large-scale PV installations with complex topographies, optimizing the performance of solar trackers can present significant challenges due to factors such as shading between rows of panels, irregular terrain, and varying sun angles throughout the year.

Conventional approaches to optimizing solar tracker performance often rely on uniform tracking strategies applied across an entire PV site, regardless of localized shading conditions or topographical variations. Such approaches can lead to suboptimal energy harvest, particularly in PV installations with undulating terrain or irregularly spaced panel rows. Other methods attempt to address this issue by implementing dynamic smart tracking systems that adjust tracker angles in real-time based on irradiance feedback. However, these systems can require additional instrumentation and increase operational complexity, limiting their scalability for large utility-scale PV power plants.

The techniques described herein can provide a method for optimizing tracking parameters on a per-tracker basis by leveraging high-resolution three-dimensional (3D) modeling of PV power plant sites. The techniques can obtain spatial data of a PV power plant, such as Light Detection and Ranging (LIDAR) scans capturing the 3D coordinates of module surfaces and terrain across the site. Based on the spatial data, a detailed 3D model of the PV power plant can be generated, including information on row spacing, module table coordinates, and terrain profiles.

Backtracking can refer to a solar tracking strategy where solar trackers rotate PV modules away from an optimal sun-facing angle to prevent shading of adjacent rows during low sun angle periods. The backtracking process can occur during early morning and late afternoon hours when the sun's position may cause one row of solar panels to cast shadows on neighboring rows, reducing overall energy production. Backtracking parameters can define the specific angles, timing, and conditions under which the solar trackers implement the backtracking strategy. In some implementations, backtracking parameters can include row spacing values, minimum sun elevation angles for backtracking activation, angular limits for tracker rotation, and time-based schedules that determine when backtracking maneuvers should begin and end. The improved tracking described herein can include backtracking as part of determining optimal module positions to maximize output.

Using the 3D model, shading patterns for the PV modules can be simulated throughout different times of day and seasons. Ray-tracing or geometry-aware shading models can be applied to compute shading events across the array of PV modules. In some implementations, the shading simulation can account for factors such as bypass diode behavior, tracker alignment, and diffuse irradiance contribution. Based on the simulated shading patterns, the techniques can determine optimized tracking parameters for each individual solar tracker. The optimization can aim to minimize energy losses due to inter-row shading while minimizing the angle of incidence to boost overall energy capture.

The techniques described herein can provide a pre-deployment static optimization approach that can enhance early-stage plant design and commissioning without requiring costly real-time irradiance sensors or complex smart tracking firmware. By computing custom tracking parameters for each tracker motor based on site-specific 3D modeling, the techniques can enable improved tracker control and higher energy yield, particularly for PV installations in complex terrain. The optimized tracking parameters can be applied to the solar trackers and validated using actual energy production data. The techniques can provide a scalable solution for optimizing hundreds or thousands of trackers across large utility-scale PV power plants, offering improved performance over conventional uniform tracking strategies.

FIG. 1 illustrates an PV power plant 100 for optimizing solar tracker parameters. The PV power plant 100 can include a parameter optimization system 110, a controller 120, first solar panels 130a, second solar panels 130b, third solar panels 130c (referred to herein collectively as "solar panels 130"), a first solar tracker 132a, a second solar tracker 132b, and a third solar tracker 132c (referred to herein collectively as "solar trackers 132"). The solar panels 130 can include any number of photovoltaic modules arranged in various configurations within the PV power plant. In some implementations, the solar panels 130 can comprise individual PV modules that are independently oriented by the solar trackers 132. In some implementations, the solar panels 130 can comprise entire rows of PV modules that are collectively oriented by a single solar tracker of the solar trackers 132. The solar panels 130 can be configured as arrays of multiple PV modules mechanically coupled together, or as discrete PV modules distributed across the installation site, among others. In an example, the first solar panels 130*a* are a first row of PV modules that are collectively oriented by the first solar tracker 132*a*, the second solar panels 130*b* are a second row of PV modules that are collectively oriented by the second solar tracker 132*b*, and the third solar panels 130*c* are a third row of PV modules that are collectively oriented by the third solar tracker 132*c*.

The solar trackers 132 can operate using default tracking parameters that define the movement and positioning behavior of the solar trackers 132 throughout the day. The default tracking parameters can include predetermined tracking parameters that specify when and how the solar trackers 132 should adjust the orientation of the solar panels 130 to maximize output by tracking solar position while avoiding inter-row shading. In some implementations, the default tracking parameters can be based on uniform row spacing assumptions and standard sun path calculations that apply generalized shading avoidance strategies across the PV power plant 100. The existing tracking parameters can include fixed tilt angles, azimuth adjustments, and timing schedules that cause the solar trackers 132 to follow the sun's movement while implementing backtracking maneuvers during early morning and late afternoon periods when shading between adjacent rows may occur. In some implementations, the default backtracking parameters can be factory-configured settings or site-wide parameters that do not account for localized terrain variations or specific row spacing differences between individual solar trackers 132.

The solar panels 130 can be positioned at different elevations across the terrain of the PV power plant 100, creating variations in height between adjacent rows that can complicate tracking optimization. The solar panels 130 may have the same tracker pile height, or different tracker pile heights, where the tracker pile height is the height of the support (i.e., pile) that raises a solar panel off the ground. In an example, the first solar panels 130*a* may be installed at a lower elevation than the second solar panels 130*b*, while the third solar panels 130*c* may be positioned at a lower elevation than the first solar panels 130*a*. The elevation differences can cause irregular shading patterns that vary from conventional flat-terrain assumptions, where higher-elevation solar panels may cast longer or shorter shadows on lower-elevation panels depending on the sun angle and time of day. In some implementations, uniform backtracking parameters may result in either insufficient shading avoidance or excessive energy loss from premature backtracking activation.

The parameter optimization system 110 can use the 3D model 112 and the optimization engine 114 to modify the tracking parameters used by the solar trackers 132 to increase output of the PV power plant 100. The parameter optimization system 110 can process spatial data through the 3D model 112 to generate detailed representations of terrain profiles, row spacing variations, and module orientations across the installation site. The optimization engine 114 can analyze shading patterns simulated by the 3D model 112 to compute customized tracking parameters for each individual solar tracker of the solar trackers 132. In some implementations, the optimization engine 114 can determine tracker-specific parameters that maximize solar irradiance capture by reducing inter-row shading losses based on the localized conditions represented in the 3D model 112. The parameter optimization system 110 can transmit the modified tracking parameters to the controller 120, which can apply the optimized parameters to the corresponding solar trackers 132 to enhance energy production efficiency across the PV power plant 100.

The parameter optimization system 110 can obtain spatial data of the PV power plant including a plurality of PV modules oriented by a plurality of solar trackers. The parameter optimization system 110 can receive the spatial data from various sources, such as aerial surveys, ground-based measurements, or existing site documentation. In some implementations, the parameter optimization system 110 can process raw spatial data to extract relevant parameters, such as inter-row distances, module heights, or terrain elevations. The spatial data can include three-dimensional coordinates of each PV module in the PV power plant 100, allowing the parameter optimization system 110 to accurately model the physical layout of the installation. In some implementations, the parameter optimization system 110 can combine multiple data sources to create a comprehensive spatial dataset, such as merging high-resolution terrain data with precise module position measurements, or integrating as-built documentation with field verification measurements.

In some implementations, a drone 140 can collect spatial data of the PV power plant installation for use in generating the 3D model. The drone 140 can fly predetermined patterns over the PV power plant 100 to capture comprehensive spatial information about the installation site and equipment. In some implementations, the drone 140 can be equipped with multiple sensors to collect different types of spatial data simultaneously, such as visual imagery, infrared measurements, or distance measurements. The drone 140 can operate at various altitudes to capture both overview data of the entire PV power plant 100 and detailed close-up information of specific areas or components. In some implementations, the drone 140 can follow automated flight paths programmed to ensure complete coverage of the PV power plant 100, such as grid patterns with specified overlap between adjacent flight segments, or targeted paths focusing on areas with complex topography or irregular panel arrangements.

In some implementations, the drone 140 can capture LIDAR data including row spacing, module table coordinates, and terrain profile information. The drone 140 can use laser pulses to measure distances to the ground and PV modules, creating point clouds that represent the three-dimensional structure of the PV power plant 100. In some implementations, the drone 140 can collect LIDAR data at different times of day to capture variations in module orientation as the solar trackers 132 adjust throughout the day. The LIDAR data captured by the drone 140 can have sufficient resolution to distinguish individual PV modules within rows and to measure variations in terrain that might affect shading patterns. In some implementations, the drone 140 can combine LIDAR scanning with GPS data to georeference the collected spatial information, such that each measured point has precise geographic coordinates, or the drone 140 can use ground control points to improve the accuracy of the spatial referencing for the LIDAR data.

In some implementations, the spatial data can be obtained from manual measurements, aerial photographs, satellite imagery, and/or a combination of these data sources. Manual measurements can include surveying equipment to record precise positions and elevations of key components throughout the PV power plant 100, such as pile foundations, tracker pivot points, module corners, or terrain features. In some implementations, aerial photographs taken from aircraft can provide visual information about the layout and condition of the PV power plant 100, which can be processed using photogrammetry techniques to extract three-dimensional information. Satellite imagery can offer broad coverage of the PV power plant 100 and surrounding terrain, which can be particularly useful for understanding regional topography and shading from distant features. In some implementations, the parameter optimization system 110 can integrate data from multiple sources to create a more complete spatial representation, such as combining high-resolution drone measurements of the PV modules with broader satellite data of the surrounding landscape, or merging precise manual measurements of specific components with comprehensive aerial survey data of the entire installation.

The parameter optimization system 110 can generate a 3D model 112 of the PV power plant based on the spatial data. The parameter optimization system 110 can process the spatial data to create a detailed three-dimensional representation of the PV power plant 100, including the physical layout of solar panels 130 and surrounding terrain features. In some implementations, the parameter optimization system 110 can incorporate multiple data sources to build the 3D model 112, such as LIDAR scans from the drone 140 or ground-based survey measurements. In some implementations, the parameter optimization system 110 can apply data filtering algorithms to remove noise or irrelevant data points from the spatial data before constructing the 3D model 112. The parameter optimization system 110 can generate the 3D model 112 with sufficient resolution to distinguish individual PV modules within rows and to accurately represent height variations across the installation site. In an example, the parameter optimization system 110 can create a mesh-based 3D model 112 with triangulated surfaces representing the solar panels 130 and the underlying terrain. In another example, the parameter optimization system 110 can generate a point-cloud-based 3D model 112 that preserves the precise spatial coordinates of each measured point in the PV power plant 100.

The parameter optimization system 110 can simulate shading patterns for the plurality of PV modules using the 3D model 112. The parameter optimization system 110 can apply ray-tracing algorithms to the 3D model 112 to calculate how shadows cast by one row of solar panels 130 affect adjacent rows throughout different times of day and seasons. In some implementations, the parameter optimization system 110 can compute the sun position for specific dates and times to determine the angle of incident sunlight on the 3D model 112. In some implementations, the parameter optimization system 110 can account for diffuse irradiance contributions in addition to direct beam radiation when simulating the shading patterns. The parameter optimization system 110 can generate time-series shading maps that show the progression of shadows across the PV power plant 100 throughout the day. In an example, the parameter optimization system 110 can simulate shading patterns for the winter solstice when sun angles are lowest and inter-row shading is most pronounced. In another example, the parameter optimization system 110 can simulate shading patterns for equinox conditions to establish baseline shading behavior for the PV power plant 100 during moderate sun angle periods.

The 3D model 112 can include information on row spacing, module table coordinates, and terrain profiles for use in simulating shading patterns. The 3D model 112 can store precise measurements of the physical distance between adjacent rows of solar panels 130, which can vary across different sections of the PV power plant 100 due to terrain constraints or installation variations. In some implementations, the 3D model 112 can represent the current tilt angles of each PV module as positioned by the solar trackers 132, allowing for accurate shadow projection calculations. In some implementations, the 3D model 112 can incorporate azimuth orientation data that describes the compass direction that the solar panels 130 face when in their neutral position. The 3D model 112 can contain detailed terrain elevation data that captures the undulations and slopes present across the installation site. In an example, the 3D model 112 can include row spacing measurements that account for the staggered arrangement of the first solar panels 130a relative to the second solar panels 130b due to terrain constraints. In another example, the 3D model 112 can incorporate terrain profile information showing that the third solar panels 130c are positioned at a lower elevation than the first solar panels 130a, which affects how shadows are cast between these rows throughout the day.

The spatial data and the 3D model 112 can achieve high-resolution tracking of shading patterns at 1-5-centimeter granularity through precise measurement techniques and detailed modeling approaches. The drone 140 can capture LIDAR data with point densities sufficient to resolve individual module edges, mounting hardware, and surface irregularities within the specified granularity range. In some implementations, the parameter optimization system 110 can process the high-density point cloud data to construct the 3D model 112 with mesh resolution that preserves centimeter-level geometric details of the solar panels 130 and terrain features. The 3D model 112 can incorporate sub-module level representations that account for frame structures, gaps between panels, and mounting system components that may influence shadow casting at fine scales. In some implementations, the parameter optimization system 110 can apply interpolation algorithms to the spatial data to generate continuous surface models with sufficient detail to track shadow boundaries and partial shading effects across individual PV cells or small groups of cells within the solar panels 130.

The spatial data and the 3D model 112 can incorporate additional objects and structures beyond the solar panels 130 and terrain features to provide comprehensive shading analysis across the PV power plant 100. The parameter optimization system 110 can process spatial measurements of inverter stations, electrical equipment enclosures, maintenance buildings, perimeter fencing, transmission towers, and other infrastructure components that may cast shadows on the solar panels 130 during certain sun positions throughout the day. In some implementations, the drone 140 can capture LIDAR data that includes the three-dimensional geometry of inverter stations positioned between rows of solar panels 130, allowing the 3D model 112 to calculate shadow projections from the inverter enclosures onto adjacent PV modules during low sun angle conditions. The 3D model 112 can store dimensional parameters of the additional structures, such as height, width, length, and orientation angles, to enable accurate shadow casting calculations that account for the complex interactions between multiple shading sources within the installation. In some implementations, the parameter optimization system 110 can incorporate the positions and dimensions of electrical transformers, switchgear buildings, or control houses that may obstruct sunlight and create localized shading zones affecting specific solar trackers 132. The optimization engine 114 can analyze the combined shading effects from both inter-row shadows and infrastructure-related shadows to determine tracking parameters that maximize total energy generation across the PV power plant 100. In an example, the 3D model 112 can include measurements of a central inverter station positioned between the first solar panels 130a and the second solar panels 130b, with the optimization engine 114 calculating that the inverter station casts a 12-meter shadow during winter morning hours that affects the eastern portions of the second solar panels 130b, requiring modified tracking parameters for the second solar tracker 132b to compensate for the additional shading source. In another example, the 3D model 112 can incorporate the geometry of transmission line support structures located near the third solar panels 130c, with the parameter optimization system 110 determining that the transmission towers create intermittent shadows during afternoon periods that reduce energy production by 3% for specific sections of the third solar panels 130c, prompting the optimization engine 114 to adjust the tracking schedule for the third solar tracker 132c to maximize energy capture during periods when the transmission tower shadows do not overlap with inter-row shading effects.

The 3D model 112 can predict power output of the solar panels 130 based on the simulated shading patterns by correlating shadow coverage with electrical performance characteristics of the PV modules. The 3D model 112 can calculate the percentage of each solar panel surface area affected by shadows at specific time intervals and apply power reduction factors corresponding to the shaded portions. In some implementations, the 3D model 112 can incorporate electrical parameters of the solar panels 130, such as current-voltage characteristics and bypass diode configurations, to determine how partial shading conditions translate to actual power losses. In some implementations, the 3D model 112 can generate hourly or sub-hourly power output predictions for each row of solar panels 130 by combining the shading analysis with solar irradiance data and module specifications. In an example, the 3D model 112 can predict that the first solar panels 130a may experience a 15% power reduction during morning hours when shadows from higher terrain features affect the eastern portions of the array. In another example, the 3D model 112 can forecast that the third solar panels 130c may maintain higher power output during late afternoon periods due to reduced inter-row shading from the lower elevation positioning relative to adjacent rows.

The 3D model 112 can incorporate electrical characteristics of the solar panels 130, including bypass diode thresholds, to predict the onset of performance losses due to partial shading. The parameter optimization system 110 can integrate electrical parameters such as diode forward voltage drops, activation thresholds, and current-voltage characteristics into the 3D model 112 to simulate the electrical response of PV modules under varying shading conditions. In some implementations, the 3D model 112 can store bypass diode specifications for each PV module, including the voltage threshold at which bypass diodes activate to redirect current around shaded cells or cell groups. The parameter optimization system 110 can use the electrical characteristics within the 3D model 112 to calculate when partial shading conditions may trigger bypass diode activation, which can cause power output reductions that exceed the proportional area of shading. In some implementations, the 3D model 112 can model the electrical behavior of individual cell strings within PV modules, allowing the parameter optimization system 110 to predict performance reduction patterns based on the specific shading geometry and diode configuration. In an example, the 3D model 112 can incorporate bypass diode threshold data to determine that shading affecting 10% of a module surface area may result in 33% power loss when the shading pattern triggers diode activation across an entire cell string.

The optimization engine 114 can process the simulated shading patterns to determine optimized tracking parameters for the solar trackers 132. The optimization engine 114 can analyze the shading data across different times of day and seasons to identify when inter-row shading begins to affect power production for each solar tracker of the solar trackers 132. In some implementations, the optimization engine 114 can calculate custom activation thresholds for tracking maneuvers based on the specific terrain profile and row spacing associated with each solar tracker of the solar trackers 132. The optimization engine 114 can generate time-based schedules that specify when each solar tracker of the solar trackers 132 should initiate off-sun tracking movements to avoid power losses from shading. In an example, the optimization engine 114 can determine that the first solar tracker 132a should begin backtracking at a 20-degree sun elevation angle during winter months due to the lower elevation positioning of the first solar panels 130a relative to adjacent rows. In another example, the optimization engine 114 can compute that the third solar tracker 132c can delay backtracking until a 15-degree sun elevation angle during summer months due to favorable terrain conditions that reduce early morning shading impacts on the third solar panels 130c.

The optimization engine 114 can compute custom tracking parameters for each solar tracker of the solar trackers 132 based on site-specific 3D modeling to maximize output by reducing energy losses due to inter-row shading. The optimization engine 114 can calculate effective row spacing values that account for the actual three-dimensional positioning of adjacent rows rather than assuming uniform flat-terrain conditions across the PV power plant 100. In some implementations, the optimization engine 114 can generate tracker-specific angular adjustment schedules that vary throughout the year based on seasonal sun path variations and corresponding shadow projections. The optimization engine 114 can incorporate bypass diode activation thresholds into the parameter calculations to determine when inter-row shading should be incorporated into tracker control or when backtracking should be implemented within tracker control to prevent diode-related power losses. In some implementations, the optimization engine 114 can determine when to utilize a tracking mode and when to utilize a tracking plus backtracking mode, in which inter-row shading is taken into account to deviate from direct solar tracking to optimize overall output. In an example, the optimization engine 114 can determine that the second solar tracker 132b requires a 5-degree earlier backtracking activation compared to standard parameters due to the elevated position of the second solar panels 130b casting longer morning shadows on the third solar panels 130c. In another example, the optimization engine 114 can compute that the first solar tracker 132a can use a modified backtracking curve that reduces unnecessary tilt adjustments during midmorning hours when the terrain profile naturally minimizes shading between the first solar panels 130a and adjacent rows.

The optimization engine 114 can determine tracking parameters that include effective row spacing values adjusted for terrain elevation differences and solar position variations throughout the day. In some implementations, the optimization engine 114 can calculate an effective row spacing of 8.5 meters for morning hours when the sun elevation angle is below 25 degrees, accounting for the elevated position of the second solar panels 130b relative to the third solar panels 130c. The optimization engine 114 can modify the effective row spacing to 7.2 meters during midday periods when higher sun angles reduce the impact of elevation differences on shadow projection between adjacent rows. In some implementations, the optimization engine 114 can determine that afternoon tracking for the first solar tracker 132a may use an effective row spacing of 9.1 meters to compensate for the lower terrain elevation of the first solar panels 130a, which creates longer shadow casting distances during western sun positions. In an example, the optimization engine 114 can generate seasonal effective row spacing parameters that range from 6.8 meters during summer solstice conditions to 10.3 meters during winter solstice periods for the third solar tracker 132c, based on the specific elevation profile and adjacent row positioning within the PV power plant 100.

In some implementations, the optimization engine 114 generates tracking parameters for the first solar tracker 132a to optimize power output of the first solar panels 130a. The optimization engine 114 can calculate specific angular adjustments for the first solar tracker 132a based on the unique shading conditions affecting the first solar panels 130a throughout different times of day. In some implementations, the optimization engine 114 can determine custom activation thresholds that initiate tracking movements for the first solar tracker 132a when shadows from adjacent rows begin to impact the power production of the first solar panels 130a. The optimization engine 114 can compute time-based schedules for the first solar tracker 132a that specify precise tilt angles for each hour of operation to maximize direct beam irradiance capture by the first solar panels 130a. In an example, the optimization engine 114 can generate tracking parameters for the first solar tracker 132a that delay morning backtracking activation by 15 minutes compared to default parameters due to terrain features that naturally reduce early shading on the first solar panels 130a. In another example, the optimization engine 114 can determine that the first solar tracker 132a should implement a modified afternoon backtracking curve with 3-degree incremental adjustments rather than standard 5-degree steps to maintain optimal power output from the first solar panels 130a during western sun positions.

In some implementations, the optimization engine 114 generates tracking parameters for the first solar tracker 132a to optimize power output of the PV power plant 100. The optimization engine 114 can analyze how the positioning of the first solar panels 130a affects the performance of adjacent rows and downstream electrical systems within the PV power plant 100. In some implementations, the optimization engine 114 can calculate tracking parameters for the first solar tracker 132a that balance localized power production against overall plant efficiency by considering interconnection constraints and power conversion limitations. The optimization engine 114 can determine coordinated tracking schedules that synchronize the movement of the first solar tracker 132a with other solar trackers 132 to minimize voltage fluctuations across the PV power plant 100 during transition periods. In an example, the optimization engine 114 can generate tracking parameters for the first solar tracker 132a that prioritize afternoon energy production when the PV power plant 100 experiences peak demand requirements, even if such parameters slightly reduce the total daily energy yield of the first solar panels 130a. In another example, the optimization engine 114 can compute tracking parameters for the first solar tracker 132a that reduce early morning power ramp rates by implementing gradual angle adjustments, which improves grid stability for the entire PV power plant 100 during startup conditions.

In some implementations, optimization engine 114 generates a predicted power output of the solar panels 130 under various conditions. The optimization engine 114 can calculate expected energy production values for each row of solar panels 130 based on the simulated shading patterns and electrical characteristics stored in the 3D model 112. In some implementations, the optimization engine 114 can generate hourly power output predictions that account for seasonal variations in sun position and corresponding shadow effects across the PV power plant 100. The optimization engine 114 can incorporate weather data, such as cloud cover patterns or ambient temperature fluctuations, to refine the predicted power output calculations for the solar panels 130. In an example, the optimization engine 114 can predict that the first solar panels 130a may experience a 12% reduction in power output during winter mornings due to extended shadow coverage from adjacent terrain features. In another example, the optimization engine 114 can forecast that the third solar panels 130c may achieve 5% higher energy production during summer afternoons compared to standard tracking parameters by implementing the optimized tracking curves that reduce unnecessary tilt adjustments.

In some implementations, the optimization engine 114 validates the 3D model 112 by comparing the predicted power output of the solar panels 130 to actual output of the solar panels 130. The optimization engine 114 can collect real-world performance data from the controller 120 over multiple days or weeks to establish a comprehensive validation dataset for the 3D model 112. In some implementations, the optimization engine 114 can perform statistical analysis on the differences between predicted and actual power output values to identify systematic modeling errors or parameter inaccuracies in the 3D model 112. The optimization engine 114 can adjust specific parameters within the 3D model 112, such as terrain elevation profiles or module reflectivity values, to minimize discrepancies between the predicted and actual output measurements. In an example, the optimization engine 114 can validate the 3D model 112 by comparing hourly production data from the second solar panels 130b against model predictions during a clear sky day, identifying a consistent 3% overestimation in morning output that can be corrected by refining the diffuse irradiance calculations in the model. In another example, the optimization engine 114 can validate the 3D model 112 by analyzing power output from the first solar panels 130a during partial cloud conditions, determining that the model accurately predicts production within 2% tolerance when accounting for measured irradiance levels.

The controller 120 can receive the optimized tracking parameters from the parameter optimization system 110. In some implementations, the controller 120 can process the optimized tracking parameters to generate control signals for each of the solar trackers 132 based on the specific optimization values determined for the respective tracker locations. In some implementations, the controller 120 can transmit the optimized tracking parameters to the solar trackers 132 for use by the solar trackers 132.

In some implementations, the controller 120 can actuate the plurality of solar trackers according to the optimized tracking parameters. The controller 120 can transmit control signals to each solar tracker of the solar trackers 132 to adjust the orientation of the solar panels 130 based on the specific tracking parameters determined for the respective tracker location. In some implementations, the controller 120 can schedule the actuation of the solar trackers 132 according to time-based parameters that specify precise angular adjustments throughout the day. In an example, the controller 120 can actuate the first solar tracker 132*a* to implement a 15-degree morning tracking angle that differs from the standard 20-degree angle that would be used by conventional systems. In another example, the controller 120 can actuate the third solar tracker 132*c* to begin afternoon backtracking 30 minutes later than default parameters would indicate, based on the optimized parameters that account for the specific terrain profile affecting the third solar panels 130*c*.

The solar panels 130 can be oriented by the solar trackers 132 to optimize energy capture based on the applied tracking parameters. The solar trackers 132 can adjust the tilt angle of the solar panels 130 throughout the day to optimize for direct beam irradiance and reduced inter-row shading losses to maximize overall energy output. In some implementations, the solar trackers 132 can position the solar panels 130 at angles that balance the competing objectives of optimal sun-facing orientation and shadow avoidance. In an example, the first solar tracker 132*a* can orient the first solar panels 130*a* at a 30-degree east-facing angle during early morning hours rather than the 45-degree angle that would provide optimal sun exposure, in order to prevent shadows from adjacent rows affecting downstream panels. In another example, the second solar tracker 132*b* can orient the second solar panels 130*b* at a modified afternoon backtracking curve that implements 3-degree incremental adjustments rather than standard 5-degree steps to maintain optimal power output during western sun positions.

In some implementations, the first solar panels 130*a* can be oriented to optimize power output of the first solar panels 130*a*. The first solar tracker 132*a* can adjust the orientation of the first solar panels 130*a* based on customized tracking parameters that account for the specific terrain conditions and row spacing affecting the first solar panels 130*a*. In some implementations, the first solar tracker 132*a* can implement a modified tracking schedule that prioritizes energy production during peak irradiance hours while accepting minimal shading during low-irradiance periods. In an example, the first solar tracker 132*a* can orient the first solar panels 130*a* at a 5-degree reduced morning backtracking angle compared to default parameters, based on the 3D model 112 showing that the terrain profile naturally reduces early shading impacts on the first solar panels 130*a*. In another example, the first solar tracker 132*a* can position the first solar panels 130*a* using a custom afternoon backtracking curve that delays the initiation of backtracking by 20 minutes compared to standard parameters, allowing the first solar panels 130*a* to maintain optimal sun-facing orientation for a longer period. Similarly, the second solar panels 130*b* and the third solar panels 130*c* can be oriented to optimize their respective power output.

In some implementations, the solar panels 130 can be oriented to optimize power output of the PV power plant 100. The solar trackers 132 can adjust the orientation of the solar panels 130 according to coordinated tracking parameters that consider the collective performance of all PV modules rather than optimizing each row in isolation. In some implementations, the solar trackers 132 can implement synchronized tracking schedules that balance localized power production against overall plant efficiency by considering interconnection constraints and power conversion limitations. In an example, the second solar tracker 132*b* can orient the second solar panels 130*b* using parameters that prioritize afternoon energy production when the PV power plant 100 experiences peak demand requirements, even if such parameters slightly reduce the total daily energy yield of the second solar panels 130*b*. In another example, the third solar tracker 132*c* can position the third solar panels 130*c* according to parameters that reduce early morning power ramp rates by implementing gradual angle adjustments, which improves grid stability for the entire PV power plant 100 during startup conditions.

In some implementations, the controller 120 provides control signals to actuate the solar trackers 132. The controller 120 can generate specific motor control commands that direct each solar tracker of the solar trackers 132 to adjust to precise angular positions based on the optimized tracking parameters. In some implementations, the controller 120 can transmit digital control signals through wired or wireless communication channels to the motor drive systems of the solar trackers 132. In an example, the controller 120 can provide pulse-width modulated control signals to the first solar tracker 132*a* that specify the exact rotational position for the first solar panels 130*a* at 15-minute intervals throughout the day. In another example, the controller 120 can transmit angular setpoint values to the second solar tracker 132*b* through a fieldbus network connection, with updated position commands calculated based on the current sun position and the optimized tracking parameters for the second solar tracker 132*b*.

In some implementations, the controller 120 provides input to the solar trackers 132 to orient the solar panels 130, such as sun location, weather conditions, and other environmental data. The controller 120 can calculate the current sun position based on astronomical algorithms and geographic coordinates of the PV power plant 100, then transmit the sun position data to the solar trackers 132 for use in determining appropriate orientation angles. In some implementations, the controller 120 can incorporate real-time weather information such as cloud cover patterns or ambient temperature into the tracking control decisions to optimize performance under varying environmental conditions. In an example, the controller 120 can provide solar elevation and azimuth angle data to the first solar tracker 132*a*, along with current wind speed measurements that may trigger safety stowing positions during high-wind events. In another example, the controller 120 can transmit diffuse irradiance ratio calculations to the third solar tracker 132*c* during partially cloudy conditions, enabling the third solar tracker 132*c* to adjust the orientation of the third solar panels 130*c* to capture more diffuse light when direct beam radiation is reduced.

In some implementations, the controller 120 provides the optimized tracking parameters to the solar trackers 132 and then the solar trackers 132 autonomously orient the solar panels 130 according to the optimized tracking parameters. The controller 120 can transmit the complete set of tracking parameters to each solar tracker of the solar trackers 132, which can store the parameters in local memory for use throughout daily operation. In some implementations, the solar trackers 132 can execute internal control algorithms that calculate the appropriate orientation angles based on the stored tracking parameters and the current time or sun position without requiring continuous communication with the controller 120. In an example, the controller 120 can provide seasonal tracking schedules to the first solar tracker 132*a*, which can then autonomously implement different tracking curves for summer, winter, and equinox periods based on the internal calendar date. In another example, the controller 120 can transmit custom effective row spacing values to the second solar tracker 132b, which can use the values within its internal tracking calculation algorithm to determine the optimal tilt angle for each sun position throughout the day without further input from the controller 120.

The controller 120 can measure the output of the solar panels 130 by collecting power generation data at regular intervals throughout the day. The controller 120 can record voltage, current, and power values from each row of the solar panels 130 to establish performance baselines under various sun angle conditions. In some implementations, the controller 120 can measure the output at one-minute intervals to capture rapid changes in production during critical morning and evening transition periods. In some implementations, the controller 120 can aggregate the output measurements into hourly averages for comparison with predicted values from the 3D model 112. In an example, the controller 120 can measure that the first solar panels 130a produce 85% of rated capacity during mid-morning hours when operating under the optimized tracking parameters. In another example, the controller 120 can measure that the third solar panels 130c generate 12% more power during late afternoon periods compared to historical performance data from similar weather conditions.

In some implementations, the optimization engine 114 calculates an expected default output that would be produced by the solar panels 130 if the default tracking parameters were applied to the solar trackers 132. The optimization engine 114 can use the 3D model 112 to simulate power production under standard tracking conditions that do not account for site-specific terrain variations or row spacing differences. In some implementations, the optimization engine 114 can generate hourly expected default output values for each row of solar panels 130 based on historical weather data and standard solar position calculations. In some implementations, the optimization engine 114 can incorporate manufacturer specifications of the solar panels 130 and default tracking algorithms to predict power output throughout different seasons. In an example, the optimization engine 114 can calculate that the second solar panels 130b would produce approximately 750 kWh per day during summer months under default tracking parameters that assume flat terrain conditions. In another example, the optimization engine 114 can determine that the first solar panels 130a would generate an expected default output of 62% capacity factor during winter mornings when using standard uniform tracking angles across the PV power plant 100.

In some implementations, the controller 120 applies the default tracking parameters to one or more reference solar trackers of the solar trackers 132 to determine an actual default output resulting from applying the default tracking parameters. The controller 120 can designate specific solar trackers as control references that continue to operate using standard tracking algorithms rather than the optimized parameters. In some implementations, the controller 120 can alternate between applying optimized and default parameters to the same solar tracker on different days to establish direct performance comparisons under similar weather conditions. In some implementations, the controller 120 can select reference solar trackers distributed across different sections of the PV power plant 100 to account for variations in terrain and shading conditions. In an example, the controller 120 can apply default tracking parameters to the second solar tracker 132b for a one-week period while adjacent trackers use optimized parameters, allowing for direct comparison of energy production between the differ-ent control strategies. In another example, the controller 120 can configure the third solar tracker 132c to use default parameters during morning hours and optimized parameters during afternoon hours, providing same-day performance data under varying sun angles and irradiance conditions.

The optimization engine 114 can determine a performance of the optimized tracking parameters by comparing the output of the solar panels 130 using the optimized tracking parameters to the expected default output or the actual default output. The optimization engine 114 can calculate percentage improvements in energy production for each solar tracker of the solar trackers 132 operating under optimized parameters relative to the baseline performance metrics. In some implementations, the optimization engine 114 can perform statistical analysis on the output data to identify patterns of improvement across different times of day, weather conditions, or seasons. In some implementations, the optimization engine 114 can generate performance reports that highlight specific periods when the optimized parameters provide the greatest energy production advantages. In an example, the optimization engine 114 can determine that the first solar panels 130a produce 8.3% more energy during winter months when using the optimized tracking parameters compared to the expected default output calculated for standard parameters. In another example, the optimization engine 114 can identify that the third solar panels 130c show a 5.7% improvement in morning production but only a 2.1% improvement during afternoon hours when compared to the actual default output measured from reference trackers using standard parameters.

The optimization engine 114 can generate new optimized tracking parameters based on the output of the solar panels 130 using the optimized tracking parameters being lower than the expected default output or the actual default output. The optimization engine 114 can analyze performance data from the controller 120 to identify specific time periods or conditions when the optimized parameters underperform compared to baseline expectations. In some implementations, the optimization engine 114 can modify the tracking activation thresholds to address morning performance deficits when the output of the first solar panels 130a falls below the expected default output during early sun angles. In some implementations, the optimization engine 114 can recalculate effective row spacing values for the second solar tracker 132b when afternoon energy production from the second solar panels 130b shows a 3% reduction compared to the actual default output measured from reference trackers. In an example, the optimization engine 114 can generate new optimized tracking parameters that delay morning backtracking activation by an additional 10 minutes for the third solar tracker 132c after detecting that the output of the third solar panels 130c is 5% lower than the expected default output during the first hour of daily operation. In another example, the optimization engine 114 can adjust the backtracking curve for the first solar tracker 132a to implement more gradual angle changes when the measured output from the first solar panels 130a shows inconsistent power production compared to the actual default output during transition periods between tracking and tracking plus backtracking modes.

The controller can apply the default tracking parameters to the solar trackers 132 based on the output of the solar panels 130 using the optimized tracking parameters being lower than the expected default output or the actual default output. The controller 120 can revert specific solar trackers to standard tracking algorithms when performance monitoring indicates that the optimized parameters are not delivering the anticipated energy gains under current operating conditions. In some implementations, the controller 120 can implement a phased reversion process that returns one section of the PV power plant 100 to default parameters while maintaining optimized parameters elsewhere to validate the performance difference. In some implementations, the controller 120 can apply the default tracking parameters selectively during specific weather conditions or seasons when the optimized parameters consistently underperform. In an example, the controller 120 can apply the default tracking parameters to the second solar tracker 132*b* during winter months after detecting that the second solar panels 130*b* produce 7% less energy with the optimized parameters compared to the expected default output calculated for standard winter conditions. In another example, the controller 120 can revert the third solar tracker 132*c* to default tracking parameters during cloudy days when diffuse irradiance conditions cause the output of the third solar panels 130*c* to fall below the actual default output measured from adjacent reference trackers operating with standard parameters.

The optimization engine 114 can generate alerts to flag potential issues with specific solar trackers or solar panels when the optimized tracking parameters underperform relative to baseline expectations. The optimization engine 114 can monitor performance data from the controller 120 to detect when energy production from individual solar trackers of the solar trackers 132 falls below predetermined threshold values compared to the expected default output or actual default output measurements. In some implementations, the optimization engine 114 can trigger automated alerts when the output of specific solar panels 130 shows consistent underperformance patterns that exceed acceptable variance limits, such as production deficits greater than 5% for three consecutive days. The optimization engine 114 can generate diagnostic alerts that identify the specific solar tracker experiencing performance issues and provide data on the magnitude and duration of the underperformance condition. In an example, the optimization engine 114 can generate an alert indicating that the first solar tracker 132*a* requires investigation when the first solar panels 130*a* produce 8% less energy than the expected default output for five consecutive mornings during clear weather conditions. In another example, the optimization engine 114 can flag the second solar tracker 132*b* for maintenance review when the second solar panels 130*b* show declining performance trends that result in 6% lower afternoon production compared to the actual default output measured from adjacent reference trackers over a two-week monitoring period.

Figure 2:
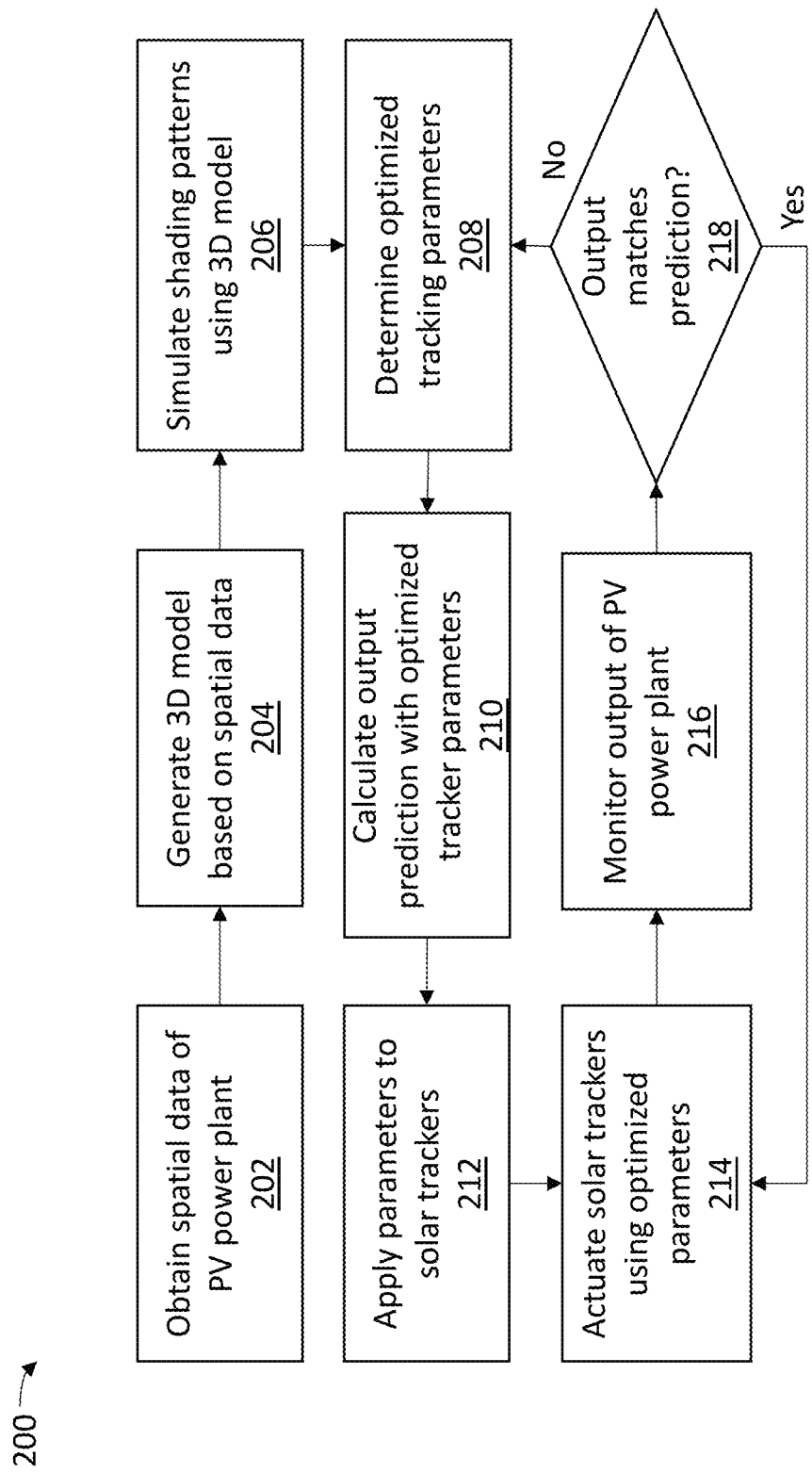
FIG. 2 illustrates a flowchart of a method for optimizing solar tracker tracking parameters using a 3D model.

FIG. 2 illustrates a flowchart of a method 200 for optimizing solar tracker tracking parameters using a 3D model. The method 200 may include more, fewer, or different operations than shown. One or more operations may be performed in the order shown, in a different order, and/or concurrently. The method 200 may be performed by one or more components of the PV power plant 100 of FIG. 1.

At operation 202, spatial data of a PV power plant is obtained. The spatial data can be collected through various measurement techniques that capture the three-dimensional layout and characteristics of the installation site. In some implementations, the spatial data can be acquired using drone-mounted LIDAR systems that scan the entire PV power plant to record precise coordinates of module surfaces and terrain features. The spatial data can include measurements of row spacing variations, module orientations, elevation changes, and terrain profiles across different sections of the installation. In an example, spatial data can be obtained through aerial LIDAR scanning that captures point cloud data with centimeter-level accuracy for each solar panel row and the underlying terrain topography. In another example, spatial data can be collected using ground-based surveying equipment combined with photogrammetry techniques to measure the exact positioning and tilt angles of individual PV modules throughout the power plant.

At operation 204, a 3D model is generated based on the spatial data. The 3D model can be constructed by processing the collected spatial measurements to create a detailed digital representation of the PV power plant layout and terrain characteristics. In some implementations, the 3D model can be built using mesh generation algorithms that convert point cloud data into triangulated surfaces representing both the solar panel arrays and the underlying ground topology. The 3D model can incorporate geometric parameters such as inter-row distances, module heights, module table coordinates, and elevation variations that affect shading patterns throughout the installation. In an example, a 3D model can be generated using computational geometry techniques that transform LIDAR point clouds into a continuous surface model with sufficient resolution to distinguish individual module edges and mounting structures. In another example, a 3D model can be constructed by combining multiple data sources, such as aerial imagery and elevation measurements, to create a comprehensive digital twin that accurately represents the physical layout and terrain features of the PV power plant.

At operation 206, shading patterns are simulated using the 3D model. The shading simulation can be performed by applying ray-tracing algorithms that calculate shadow projections across the PV modules for different sun positions throughout the day and across seasons. In some implementations, the shading patterns can be computed using geometry-aware models that account for the three-dimensional positioning of adjacent rows and terrain variations that influence shadow casting behavior. The simulation can incorporate solar position calculations and irradiance modeling to determine when and where shadows from one row of panels affect neighboring rows during critical morning and evening periods. In an example, shading patterns can be simulated for winter solstice conditions when low sun angles create the most pronounced inter-row shadowing effects across the installation. In another example, shading patterns can be calculated for equinox periods to establish baseline shadow behavior during moderate sun elevation angles, accounting for both direct beam radiation and diffuse irradiance contributions.

In some implementations, the 3D model is validated based on actual historical production data. The validation process can be conducted by comparing model-predicted energy output values against measured power production data collected from operational PV modules within the power plant. In some implementations, the validation can be performed using statistical analysis techniques that identify discrepancies between simulated and actual performance metrics to refine model parameters and improve prediction accuracy. The validation process can incorporate real-world factors such as bypass diode behavior, module degradation, and environmental conditions that may not be fully captured in the initial 3D model. In an example, the 3D model can be validated by analyzing hourly production data from reference solar panels during clear sky conditions to verify that predicted shading losses match observed power reductions. In another example, validation can be performed by comparing model predictions against actual energy output measurements during partially cloudy conditions to assess the accuracy of diffuse irradiance calculations and shadow edge effects. Validation of the 3D model using historical data may be an optional part of the method 200 to improve and/or verify an accuracy of the 3D model. In some implementations, this operation is not performed.

At operation 208, optimized tracking parameters are determined. The optimization process can be executed by analyzing the simulated shading patterns to calculate custom tracking settings that reduce energy losses while maximizing solar irradiance capture for each individual solar tracker to maximize overall energy output. In some implementations, the optimized parameters can be computed using mathematical optimization algorithms that balance competing objectives of shadow avoidance and optimal sun-facing orientation throughout different times of day and seasons. The parameter determination can incorporate electrical characteristics of the PV modules, such as bypass diode thresholds and current-voltage relationships, to predict when partial shading conditions trigger performance reduction. In an example, optimized tracking parameters can be determined by calculating effective row spacing values that account for terrain elevation differences and result in earlier backtracking activation for trackers positioned on higher ground. In another example, tracking parameters can be optimized by computing custom angular adjustment schedules that delay backtracking initiation for trackers in favorable terrain positions where natural topography reduces early morning shading impacts.

At operation 208, the optimized tracking parameters can be determined by implementing candidate tracking parameters within the 3D model 112 to evaluate which parameter sets improve energy output for each solar tracker of the solar trackers 132. The optimization engine 114 can generate multiple candidate parameter configurations that vary backtracking activation thresholds, effective row spacing values, and angular adjustment schedules for each tracker location within the PV power plant 100. In some implementations, the optimization engine 114 can simulate the performance of each candidate parameter set by applying the parameters to the 3D model 112 and calculating predicted energy production under various sun angle conditions and seasonal variations. The optimization engine 114 can compare the simulated energy output results from different candidate parameters to identify the configuration that maximizes power generation while minimizing shading losses for each specific solar tracker position. In an example, the optimization engine 114 can test candidate tracking parameters that range from 15-degree to 25-degree activation thresholds for the first solar tracker 132a and determine that an 18-degree threshold produces 3.2% higher energy output compared to standard 20-degree parameters. In another example, the optimization engine 114 can evaluate candidate effective row spacing values between 7.5 meters and 9.5 meters for the second solar tracker 132b and select the 8.3-meter spacing that results in optimal balance between morning shadow avoidance and afternoon energy capture based on the 3D model 112 simulations.

At operation 210, the optimization engine 114 can calculate predicted energy output values for each solar tracker of the solar trackers 132 using the determined optimized backtracking parameters. The optimization engine 114 can apply the customized backtracking settings to the 3D model 112 to simulate power production throughout different time periods and seasonal conditions based on the tracker-specific parameter configurations. In some implementations, the optimization engine 114 can compute hourly energy predictions by incorporating the optimized effective row spacing values, activation thresholds, and angular adjustment schedules into shading calculations that account for bypass diode behavior and irradiance variations. The optimization engine 114 can generate comparative output predictions that quantify the expected energy gains from the optimized parameters relative to default backtracking strategies applied across the PV power plant 100. In an example, the optimization engine 114 can calculate that the first solar tracker 132a may produce 6.8% higher daily energy output during winter months when operating with the optimized 18-degree activation threshold compared to standard 20-degree parameters. In another example, the optimization engine 114 can predict that the second solar tracker 132b may achieve 4.2% increased afternoon energy production when using the optimized 8.3-meter effective row spacing compared to uniform 8.0-meter spacing assumptions applied to conventional backtracking algorithms.

At operation 212, the optimized tracking parameters are applied to solar trackers. The parameter application process can be implemented by transmitting the customized tracking settings to individual tracker control systems that store and utilize the optimized values during daily operation. In some implementations, the parameters can be applied through communication networks that distribute tracker-specific settings to motor drive systems responsible for positioning the solar panels throughout the day. The application process can include configuration of time-based schedules, angular limits, and activation thresholds that define when and how each tracker implements backtracking maneuvers to avoid inter-row shading. In an example, parameters can be applied to solar trackers by uploading seasonal backtracking curves that specify different optimization strategies for summer, winter, and equinox periods based on varying sun path characteristics. In another example, parameters can be applied by configuring effective row spacing values and minimum sun elevation thresholds that trigger customized backtracking behavior for each tracker based on its specific terrain and row spacing conditions.

At operation 214, solar trackers are actuated using optimized parameters. The actuation process can be performed by motor control systems of the solar trackers that adjust panel orientations according to the customized tracking schedules and angular setpoints determined during the optimization process. In some implementations, the actuation can be executed through automated control algorithms that calculate real-time positioning commands based on current sun position data and the stored optimized parameters for each tracker. The actuation process can incorporate safety protocols and operational constraints that ensure proper tracker movement while implementing the optimized tracking strategies throughout daily operation cycles. In an example, solar trackers can be actuated using pulse-width modulated control signals that position panels at specific tilt angles calculated from optimized tracking curves during early morning and late afternoon periods. In another example, trackers can be actuated through fieldbus communication systems that receive updated positioning commands every few minutes based on astronomical calculations and the customized effective row spacing parameters for each tracker location.

At operation 216, output of the PV power plant is monitored. The monitoring process can be conducted by collecting real-time power generation data from individual tracker sections and aggregating the measurements to assess overall plant performance under the optimized tracking parameters. In some implementations, the monitoring can be performed using data acquisition systems that record voltage, current, and power values at regular intervals to establish performance baselines and detect variations in energy production. The monitoring process can incorporate weather data correlation and statistical analysis to distinguish between performance changes due to environmental conditions and those resulting from the optimized tracking parameters. In an example, PV power plant output can be monitored by measuring hourly energy production from each tracker section and comparing the values against historical performance data from similar weather conditions. In another example, output monitoring can be performed by recording power generation at one-minute intervals during critical morning and evening transition periods to capture the effects of optimized tracking on energy capture during low sun angle conditions.

At operation 218, a determination is made whether the output of the PV power plant matches predicted output from the 3D model. The comparison process can be executed by analyzing measured power production data against model-predicted values to assess the accuracy of the 3D model and the effectiveness of the optimized tracking parameters. In some implementations, the determination can be performed using statistical methods that calculate percentage differences between predicted and actual energy output values across different time periods and operating conditions. The evaluation process can incorporate tolerance thresholds and confidence intervals that define acceptable ranges of variation between modeled and measured performance metrics. In an example, output matching can be determined by comparing daily energy production totals against 3D model predictions and identifying whether differences exceed predetermined variance limits of 5% for three consecutive days. In another example, the determination can be made by analyzing hourly production data during specific weather conditions to verify that measured shading losses align with simulated shadow patterns within acceptable accuracy ranges.

When the output of the PV power plant matches the predicted output from the 3D model, the method 200 continues at operation 214 to maintain implementation of the optimized tracking parameters. The parameter optimization system can determine that the 3D model accurately represents the actual operating conditions of the PV power plant when the measured energy production aligns with the simulated predictions within acceptable tolerance ranges. In some implementations, the controller can continue to actuate the solar trackers according to the validated optimized parameters without requiring parameter adjustments or model recalibration. The ongoing implementation at operation 214 can maintain the customized tracking schedules and angular setpoints that have been confirmed to produce the expected energy gains through the validation process. In an example, when daily energy production measurements from the first solar tracker match the 3D model predictions within 2% variance for a week-long monitoring period, the method 200 can continue applying the optimized parameters to the first solar tracker during subsequent operation cycles. In another example, the method 200 can proceed with operation 214 when hourly production data from multiple solar trackers demonstrates consistent alignment with model predictions across varying weather conditions and seasonal sun angle changes.

When the output of the PV power plant does not match the predicted output from the 3D model, the method 200 returns to operation 208 or operation 210 to refine the 3D model and improve prediction accuracy or to determine new optimized tracking parameters based on the difference between the predicted output and the actual output. The parameter optimization system can identify discrepancies between measured energy production and simulated values that exceed acceptable tolerance thresholds, indicating that the 3D model may not accurately capture all operational factors affecting the PV power plant. In some implementations, the optimization engine can analyze the specific patterns of deviation between predicted and actual output to determine which model parameters require adjustment, such as terrain elevation profiles, module reflectivity coefficients, or bypass diode activation thresholds. The model tuning process can incorporate the collected performance data from operation 216 to recalibrate shading calculations, irradiance modeling, or electrical characteristics within the 3D model. In an example, when the first solar tracker consistently produces 8% less energy than predicted during morning hours, the method 200 can return to operation 208 to adjust diffuse irradiance calculations or terrain shadow projections in the 3D model. In another example, the method 200 can proceed to operation 208 or operation 210 when multiple solar trackers show systematic underperformance compared to model predictions, prompting recalibration of bypass diode thresholds or inter-row shading algorithms to better reflect actual operating conditions.

Figure 3:
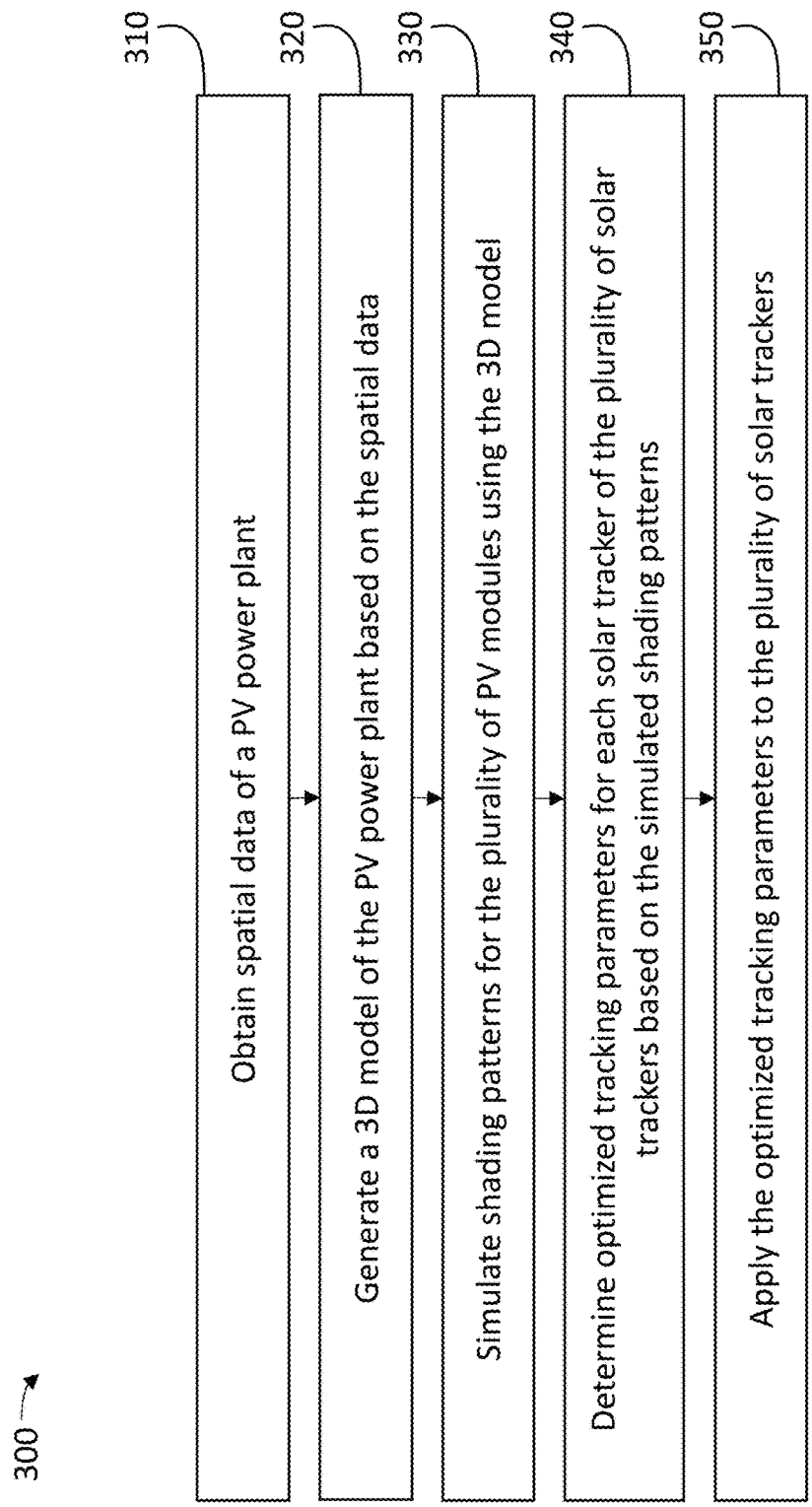
FIG. 3 illustrates a flowchart of a method for optimizing tracking parameters of solar trackers in a PV power plant using a 3D model.

FIG. 3 illustrates a flowchart of a method 300 for optimizing tracking parameters of solar trackers in a PV power plant using a 3D model. The method 300 may include more, fewer, or different operations than shown. One or more operations may be performed in the order shown, in a different order, and/or concurrently. The method 300 may be performed by one or more components of the PV power plant 100 of FIG. 1.

At operation 310, spatial data of a photovoltaic power plant including a plurality of PV modules oriented by a plurality of solar trackers is obtained. The spatial data can be collected through various measurement techniques that capture the three-dimensional layout and characteristics of the installation site. In some implementations, the spatial data can be acquired using drone-mounted LIDAR systems that scan the entire PV power plant to record precise coordinates of module surfaces and terrain features. The spatial data can include measurements of row spacing variations, module orientations, elevation changes, and terrain profiles across different sections of the installation. In an example, spatial data can be obtained through aerial LIDAR scanning that captures point cloud data with centimeter-level accuracy for each solar panel row and the underlying terrain topography. In another example, spatial data can be collected using ground-based surveying equipment combined with photogrammetry techniques to measure the exact positioning and tilt angles of individual PV modules throughout the power plant. The spatial data may comprise LIDAR data including row spacing, module table coordinates, and terrain profile information. In some implementations, the LIDAR data can be processed to extract geometric parameters such as inter-row distances, module table coordinates, and elevation variations that affect shading patterns throughout the installation. In an example, LIDAR data can include row spacing measurements that vary from 6.5 meters to 8.2 meters across different terrain sections of the PV power plant. In another example, the LIDAR data can capture module tilt angles ranging from 15 degrees to 35 degrees and azimuth orientations that deviate from true south by up to 10 degrees due to site constraints.

At operation 320, a 3D model of the PV power plant is generated based on the spatial data. The 3D model can be constructed by processing the collected spatial measurements to create a detailed digital representation of the PV power plant layout and terrain characteristics. In some implementations, the 3D model can be built using mesh generation algorithms that convert point cloud data into triangulated surfaces representing both the solar panel arrays and the underlying ground topology. The 3D model can incorporate geometric parameters such as inter-row distances, module table coordinates, and elevation variations that affect shading patterns throughout the installation. In an example, a 3D model can be generated using computational geometry techniques that transform LIDAR point clouds into a continuous surface model with sufficient resolution to distinguish individual module edges and mounting structures. In another example, a 3D model can be constructed by combining multiple data sources, such as aerial imagery and elevation measurements, to create a comprehensive digital twin that accurately represents the physical layout and terrain features of the PV power plant.

At operation 330, shading patterns for the plurality of PV modules are simulated using the 3D model. The shading simulation can be performed by applying ray-tracing algorithms that calculate shadow projections across the PV modules for different sun positions throughout the day and across seasons. In some implementations, the shading patterns can be computed using geometry-aware models that account for the three-dimensional positioning of adjacent rows and terrain variations that influence shadow casting behavior. The simulation can incorporate solar position calculations and irradiance modeling to determine when and where shadows from one row of panels affect neighboring rows during critical morning and evening periods. In an example, shading patterns can be simulated for winter solstice conditions when low sun angles create the most pronounced inter-row shadowing effects across the installation. In another example, shading patterns can be calculated for equinox periods to establish baseline shadow behavior during moderate sun elevation angles, accounting for both direct beam radiation and diffuse irradiance contributions.

The simulation of shading patterns may comprise applying a ray-tracing or geometry-aware shading model to the 3D model to compute shading events across the plurality of PV modules. In some implementations, the ray-tracing algorithms can trace light paths from the sun position through the 3D model to identify which portions of PV module surfaces receive direct illumination or are shadowed by adjacent structures. In an example, a ray-tracing model can compute shading events by casting virtual light rays at 15-minute intervals throughout the day to determine shadow boundaries across the PV module array. In another example, a geometry-aware shading model can calculate shadow projections by analyzing the geometric relationships between adjacent module rows and terrain features to predict shading patterns without requiring intensive ray-casting computations. The computation of shading events across the plurality of PV modules may include computing at least one of diode behavior, tracker alignment, and diffuse irradiance contribution. In some implementations, the shading simulation can incorporate electrical characteristics of bypass diodes to predict when partial shading conditions trigger diode activation and corresponding power losses. In an example, diode behavior computations can model the voltage thresholds at which bypass diodes activate when shading affects specific cell strings within PV modules. In another example, tracker alignment calculations can account for mechanical tolerances and installation variations that cause individual trackers to deviate from ideal positioning angles.

At operation 340, optimized tracking parameters for each solar tracker of the plurality of solar trackers are determined based on the simulated shading patterns. The optimization process can be executed by analyzing the simulated shading patterns to calculate custom tracking settings that reduce energy losses while increasing solar irradiance capture for each individual solar tracker to optimize for overall energy output. In some implementations, the optimized parameters can be computed using mathematical optimization algorithms that balance competing objectives of shadow avoidance and optimal sun-facing orientation throughout different times of day and seasons. The parameter determination can incorporate electrical characteristics of the PV modules, such as bypass diode thresholds and current-voltage relationships, to predict when partial shading conditions trigger performance reduction. In an example, optimized tracking parameters can be determined by calculating effective row spacing values that account for terrain elevation differences and result in earlier backtracking activation for trackers positioned on higher ground. In another example, tracking parameters can be optimized by computing custom angular adjustment schedules that delay backtracking initiation for trackers in favorable terrain positions where natural topography reduces early morning shading impacts.

The optimized tracking parameters may include at least one effective row spacing. In some implementations, the effective row spacing can be calculated to account for the actual three-dimensional positioning of adjacent rows rather than assuming uniform flat-terrain conditions across the PV power plant. In an example, an effective row spacing of 7.8 meters can be determined for a tracker positioned on elevated terrain, compared to the physical row spacing of 8.5 meters measured horizontally. In another example, effective row spacing values can be adjusted seasonally, ranging from 6.9 meters during summer months to 9.2 meters during winter periods based on varying sun path characteristics. The at least one effective row spacing may correspond to a solar position. In some implementations, different effective row spacing values can be calculated for different sun elevation angles and azimuth positions throughout the day. In an example, an effective row spacing of 8.1 meters can be determined for morning sun positions with elevation angles below 25 degrees, while a spacing of 7.4 meters can be calculated for afternoon positions with similar elevation angles. In another example, effective row spacing parameters can be adjusted based on seasonal solar positions, with winter solstice conditions requiring spacing values 15% larger than summer solstice parameters. The determination of optimized tracking parameters may comprise simulating sun paths for different days and seasons and determining the optimized tracking parameters that maximize energy generation for PV modules of the plurality of PV modules oriented by each solar tracker across the different days and seasons. In some implementations, sun path simulations can be performed for representative days throughout the year, including solstices, equinoxes, and intermediate seasonal periods to capture the full range of solar position variations. In an example, sun paths can be simulated for the winter solstice, spring equinox, summer solstice, and fall equinox to establish seasonal tracking parameter sets for each tracker. In another example, monthly sun path simulations can be performed to generate twelve distinct parameter configurations that account for gradual seasonal transitions in solar position and corresponding shading patterns.

At operation 350, the optimized tracking parameters are applied to the plurality of solar trackers. The parameter application process can be implemented by transmitting the customized tracking settings to individual tracker control systems that store and utilize the optimized values during daily operation. In some implementations, the parameters can be applied through communication networks that distribute tracker-specific settings to motor drive systems responsible for positioning the solar panels throughout the day. The application process can include configuration of time-based schedules, angular limits, and activation thresholds that define when and how each tracker implements backtracking maneuvers to avoid inter-row shading. In an example, parameters can be applied to solar trackers by uploading seasonal backtracking curves that specify different optimization strategies for summer, winter, and equinox periods based on varying sun path characteristics. In another example, parameters can be applied by configuring effective row spacing values and minimum sun elevation thresholds that trigger customized backtracking behavior for each tracker based on its specific terrain and row spacing conditions. The plurality of solar trackers may be actuated according to the optimized tracking parameters. In some implementations, the actuation can be executed through automated control algorithms that calculate real-time positioning commands based on current sun position data and the stored optimized parameters for each tracker. In an example, solar trackers can be actuated using pulse-width modulated control signals that position panels at specific tilt angles calculated from optimized tracking curves during early morning and late afternoon periods. In another example, trackers can be actuated through fieldbus communication systems that receive updated positioning commands every few minutes based on astronomical calculations and the customized effective row spacing parameters for each tracker location.

The 3D model may be validated using actual energy production data from a set of PV modules of the plurality of PV modules oriented by a reference solar tracker of the plurality of solar trackers. In some implementations, the validation process can be conducted by comparing model-predicted energy output values against measured power production data collected from operational PV modules within the power plant. In an example, the 3D model can be validated by analyzing hourly production data from reference solar panels during clear sky conditions to verify that predicted shading losses match observed power reductions. In another example, validation can be performed by comparing model predictions against actual energy output measurements during partially cloudy conditions to assess the accuracy of diffuse irradiance calculations and shadow edge effects. The validation of the 3D model may comprise comparing model-predicted energy production data generated using the 3D model to the actual energy production data and, based on the comparison, adjusting parameters of the 3D model to reduce a difference between the model-predicted energy production data and the actual energy production data. In some implementations, statistical analysis techniques can be applied to identify discrepancies between simulated and actual performance metrics to refine model parameters and improve prediction accuracy. In an example, model parameters can be adjusted when predicted energy output consistently exceeds actual measurements by more than 3% during morning hours, indicating potential overestimation of direct beam irradiance calculations. In another example, terrain elevation profiles within the 3D model can be refined when systematic underperformance patterns suggest that shadow projections are not accurately representing actual shading conditions across the installation.

The 3D model can be validated and tuned at multiple stages throughout the optimization process to ensure accurate representation of actual operating conditions within the PV power plant. In some implementations, initial validation can be performed before determining the optimized tracking parameters by comparing preliminary model predictions against historical energy production data from representative solar trackers operating under default tracking conditions. A parameter optimization system can collect baseline performance measurements from selected reference trackers and compare the measured output values against predictions generated by the 3D model to identify systematic modeling errors or parameter inaccuracies. In some implementations, post-application validation can be conducted after the optimized tracking parameters have been applied to the plurality of solar trackers by monitoring actual energy production from optimized trackers and comparing the measured performance against model predictions under the new parameter settings. Discrepancies between predicted and actual output values can be analyzed to determine whether the 3D model accurately captures the effects of the optimized tracking parameters on energy production. In an example, the 3D model can be tuned before parameter optimization by adjusting terrain elevation profiles when initial validation shows that morning shading predictions consistently differ from measured power reductions by more than 5% across multiple reference trackers. In another example, post-application tuning can be performed by refining bypass diode activation thresholds within the 3D model when optimized trackers produce energy output that deviates from model predictions by more than predetermined tolerance limits during critical tracking periods.

In an example implementation, a 500-megawatt utility-scale photovoltaic power plant located in Arizona with undulating desert terrain demonstrates the technical advantages of the optimized tracking approach. The installation contains 2,400 single-axis solar trackers arranged across 1,200 acres of variable topography, with elevation changes ranging from 15 meters to 45 meters across the site. Traditional uniform tracking parameters applied across the entire facility result in suboptimal energy production due to the significant terrain variations and irregular row spacing that ranges from 7.2 meters to 9.8 meters between adjacent tracker rows.

A drone equipped with high-resolution LIDAR sensors conducts a comprehensive aerial survey of the power plant, capturing spatial data with 2-centimeter accuracy across the entire installation. The LIDAR system records precise three-dimensional coordinates of each photovoltaic module surface, tracker mounting structure, and terrain feature throughout the site. The collected spatial data reveals that 340 trackers are positioned on elevated ridges with row spacing compressed to 7.2 meters due to terrain constraints, while 180 trackers occupy lower valley areas with expanded row spacing of 9.8 meters. The remaining trackers are distributed across intermediate elevations with row spacing values between 8.0 and 8.6 meters.

The parameter optimization system processes the LIDAR data to generate a detailed three-dimensional model that accurately represents the physical layout and terrain characteristics of the power plant. The model incorporates electrical characteristics of the photovoltaic modules, including bypass diode activation thresholds of 0.5 volts and current-voltage relationships specific to the 540-watt monocrystalline silicon panels installed throughout the facility. Ray-tracing algorithms simulate shading patterns across the installation for representative days throughout the year, including winter solstice conditions when sun elevation angles drop to 26 degrees and create the most pronounced inter-row shadowing effects.

The shading simulation reveals that trackers positioned on elevated terrain experience shadow onset 45 minutes earlier during morning hours compared to trackers in lower elevations, while afternoon shading begins 30 minutes later for the elevated positions. The optimization engine analyzes the simulated shading patterns and determines customized tracking parameters for each individual tracker based on the specific terrain profile and adjacent row positioning. For the 340 trackers on elevated ridges, the optimization process calculates effective row spacing values of 6.8 meters for morning backtracking activation, compared to the physical horizontal spacing of 7.2 meters. The 180 trackers in valley positions receive effective row spacing parameters of 10.2 meters, accounting for the beneficial shading reduction provided by the lower elevation positioning.

The optimization engine generates seasonal backtracking curves that specify different activation thresholds throughout the year. During winter months, elevated trackers begin backtracking, or deviating from default parameters for direct solar tracking, when sun elevation angles reach 22 degrees, while valley trackers delay backtracking until sun angles drop to 18 degrees. Summer backtracking parameters allow elevated trackers to maintain optimal sun-facing orientation until sun elevation angles decrease to 15 degrees, while valley trackers continue normal tracking until 12-degree elevation angles. The customized parameters result in backtracking activation times that vary by up to 35 minutes between different tracker locations during critical morning and evening periods.

The controller applies the optimized tracking parameters to each tracker through a fiber-optic communication network that transmits tracker-specific settings to individual motor drive systems. Each tracker stores the customized effective row spacing values, seasonal activation thresholds, and angular adjustment schedules in local memory for autonomous operation throughout daily tracking cycles. The actuation process implements pulse-width modulated control signals that position photovoltaic panels at precise tilt angles calculated from the optimized tracking curves, with positioning accuracy maintained within 0.1 degrees of target angles.

Performance monitoring over a six-month validation period demonstrates significant energy production improvements compared to uniform tracking strategies. The 340 elevated trackers achieve 7.2% higher energy output during winter months and 4.8% improvement during summer periods, while the 180 valley trackers show 5.1% winter gains and 3.4% summer increases. The intermediate elevation trackers produce energy improvements ranging from 2.9% to 6.3% depending on specific terrain conditions and seasonal variations. The overall power plant experiences a 5.7% increase in annual energy production, equivalent to an additional 28.5 gigawatt-hours of electricity generation per year.

The technical advantages of the implementation include elimination of premature backtracking activation that previously reduced energy capture by up to 12% during optimal irradiance periods. The customized parameters prevent unnecessary tilt adjustments for trackers in favorable terrain positions while ensuring adequate shadow avoidance for trackers in challenging locations. The approach achieves fine-grained optimization without requiring costly real-time irradiance sensors or complex smart tracking firmware, providing scalable performance enhancement across thousands of tracker motors. The validation process confirms that model predictions align with actual energy production within 1.8% accuracy, demonstrating the reliability of the three-dimensional modeling approach for utility-scale photovoltaic installations with complex topography.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatuses, devices, and machines for processing data, including by way of example a programmable processor, a computer, a system on a chip, or multiple ones, or combinations, of the foregoing. The apparatus can include special purpose logic circuitry (e.g., an FPGA, an ASIC, etc.). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

Such computing systems may include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the various computing systems described herein can include a single module, a logic device having one or more processing modules, or one or more servers.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in con- nection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for various implementations, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

The invention claimed is:

1. A method for optimizing power output of a photovoltaic (PV) power plant including a plurality of PV modules oriented by a plurality of solar trackers, comprising:

obtaining Light Detection and Ranging (LIDAR) spatial data of the PV power plant, the spatial data including row spacing, tracker pile height, azimuth, and terrain profile information;

generating a high-resolution three-dimensional (3D) site geometry model of the PV power plant based on the spatial data;

simulating shading patterns for the plurality of PV modules using the 3D model by applying a ray-tracing or geometry-aware shading model to compute shading events across the plurality of PV modules, including computing at least one of bypass diode behavior, tracker alignment, and diffuse irradiance contribution;

determining optimized tracking parameters for each solar tracker of the plurality of solar trackers based on the simulated shading patterns, the optimized tracking parameters including at least one effective row spacing corresponding to a solar position; and applying the optimized tracking parameters to the plurality of solar trackers.

2. The method of claim 1, further comprising actuating the plurality of solar trackers according to the optimized tracking parameters.

3. The method of claim 1, wherein determining the optimized tracking parameters comprises:

simulating sun paths for different days and seasons; and determining the optimized tracking parameters that maximize energy output for PV modules of the plurality of PV modules oriented by each solar tracker across the different days and seasons.

4. The method of claim 1, further comprising validating the 3D model using actual energy production data from a set of PV modules of the plurality of PV modules oriented by a reference solar tracker of the plurality of solar trackers.

5. The method of claim 4, wherein validating the 3D model comprises:

comparing model-predicted energy production data generated using the 3D model to the actual energy production data; and based on the comparison, adjusting parameters of the 3D model to reduce a difference between the model-predicted energy production data and the actual energy production data.

6. A non-transitory, computer-readable medium including instructions which, when executed by one or more processors, cause the one or more processors to:

obtain Light Detection and Ranging (LIDAR) spatial data of a photovoltaic (PV) power plant including a plurality of PV modules oriented by a plurality of solar trackers, the spatial data including row spacing, tracker pile height, azimuth, and terrain profile information;

generate a high-resolution three-dimensional (3D) site geometry model of the PV power plant based on the spatial data;

simulate shading patterns for the plurality of PV modules using the 3D model by applying a ray-tracing or geometry-aware shading model to compute shading events across the plurality of PV modules, including computing at least one of bypass diode behavior, tracker alignment, and diffuse irradiance contribution;

determine optimized tracking parameters for each solar tracker of the plurality of solar trackers based on the simulated shading patterns, the optimized tracking parameters including at least one effective row spacing corresponding to a solar position; and apply the optimized tracking parameters to the plurality of solar trackers.

7. The non-transitory, computer-readable medium of claim 6, wherein the instructions further cause the one or more processors to actuate the plurality of solar trackers according to the optimized tracking parameters.

8. The non-transitory, computer-readable medium of claim 6, wherein the instructions cause the one or more processors to determine the optimized tracking parameters by:
   simulating sun paths for different days and seasons; and
   determining the optimized tracking parameters that minimize energy loss for PV modules of the plurality of PV modules oriented by each solar tracker across the different days and seasons.

9. The non-transitory, computer-readable medium of claim 6, wherein the instructions further cause the one or more processors to validate the 3D model using actual energy production data from a set of PV modules of the plurality of PV modules oriented by a reference solar tracker of the plurality of solar trackers.

10. The non-transitory, computer-readable medium of claim 9, wherein validating the 3D model comprises:
   comparing model-predicted energy production data generated using the 3D model to the actual energy production data; and
   based on the comparison, adjusting parameters of the 3D model to reduce a difference between the model-predicted energy production data and the actual energy production data.

\* \* \* \* \*